United States Patent
Kim et al.

(10) Patent No.: US 8,802,257 B2
(45) Date of Patent: Aug. 12, 2014

(54) BATTERY PACK AND DRIVING METHOD THEREOF

(75) Inventors: Jinwan Kim, Yongin-si (KR); Jongwoon Yang, Yongin-si (KR); Susumu Segawa, Yogin-si (KR); Tetsuya Okada, Yongin-si (KR); Euijeong Hwang, Yongin-si (KR); Sesub Sim, Yongin-si (KR); Hanseok Yun, Yongin-si (KR); Beomgyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 379 days.

(21) Appl. No.: 12/881,131

(22) Filed: Sep. 13, 2010

(65) Prior Publication Data
US 2011/0104525 A1    May 5, 2011

(30) Foreign Application Priority Data
Oct. 30, 2009    (KR) .................. 10-2009-0104493

(51) Int. Cl.
*H01M 2/34* (2006.01)
*H01M 10/42* (2006.01)
*H01M 10/44* (2006.01)
*H01M 10/48* (2006.01)

(52) U.S. Cl.
USPC .............................. 429/61; 429/90

(58) Field of Classification Search
None
See application file for complete search history.

(56) References Cited

U.S. PATENT DOCUMENTS

| 5,831,350 A | * | 11/1998 | McConkey et al. | ............ 307/150 |
| 2007/0229026 A1 | | 10/2007 | Morioka et al. | |

FOREIGN PATENT DOCUMENTS

| JP | 2007-273315 | 10/2007 |
| JP | 2007-305344 | 11/2007 |
| JP | 2008-021619 | 1/2008 |

OTHER PUBLICATIONS

Patent Abstracts of Japan and English machine translation of Japanese Publication 2007-305344 listed above, 15 pages.
Patent Abstracts of Japan and English machine translation of Japanese Publication 2008-021619 listed above, 22 pages.

* cited by examiner

*Primary Examiner* — Jonathan Crepeau
(74) *Attorney, Agent, or Firm* — Christie, Parker & Hale, LLP

(57) ABSTRACT

A battery pack and a driving method thereof. The battery pack includes a battery cell; a charge switch and a discharge switch installed in a charge/discharge line of a battery cell; and a microcontroller to sense and store voltages of the battery cell, to compare the voltages of the battery cell before and after the microcontroller is reset, and to controls the charge switch and the discharge switch based on the sensed voltages of the battery cell such that the microcontroller turns off only one of the charge switch and the discharge switch when there is a change between the voltages of the battery cell before and after the microcontroller is reset.

2 Claims, 4 Drawing Sheets

BATTERY PACK AND DRIVING METHOD THEREOF

CROSS-REFERENCE TO RELATED APPLICATION

This application claims priority to and the benefit of Korean Patent Application No. 10-2009-0104493, filed in the Korean Intellectual Property Office on Oct. 30, 2009, the disclosure of which is incorporated herein by reference.

BACKGROUND

1. Field

Aspects of the present invention relate to a battery pack, and a driving method thereof.

2. Description of the Related Art

Recently, compact and light electrical and electronic apparatuses, such as cellular phones, notebook computers, camcorders, and the like have been actively developed and produced. Battery packs are built in the portable electrical and electronic apparatuses so that the portable electrical and electronic apparatuses can operate in locations where an additional power source is not provided. Due to their economy, rechargeable batteries are often used in battery packs. The batteries include nickel-cadmium (Ni—Cd) batteries, nickel-hydrogen (Ni-MH) batteries, a lithium (Li) batteries, and a lithium ion (Li-ion) battery. In particular, since the operation voltage of the lithium battery is three times higher than the operation voltages of the Ni—Cd battery and the Ni—H battery that are generally used as power sources of the portable electronic apparatuses, and the energy density per unit weigh of the lithium ion battery is high, the use of the lithium ion battery is rapidly increasing.

SUMMARY

Aspects of the present invention provide a battery pack, which can be prevented from being reused when battery cells are replaced from the battery pack, a charge switch, a discharge switch and a fuse are turned off and a microcontroller enters into a permanent failure mode so as not to be reused, and a driving method thereof.

According to an aspect of the present invention, a battery pack is provided. The battery pack includes a battery cell; a charge switch and a discharge switch installed in a charge/discharge line of a battery cell; and a microcontroller to sense and store voltages of the battery cell, to compare the voltages of the battery cell before and after the microcontroller is reset, and to control the charge switch and the discharge switch based on the sensed voltages of the battery cell such that the microcontroller turns off only one of the charge switch or the discharge switch when there is a change between the voltages of the battery cell before and after the microcontroller is reset.

According to another aspect of the invention, the battery pack may further include a fuse installed in the charge/discharge line of the battery cell.

According to another aspect of the invention, when the charge switch or the discharge switch is turned off after the microcontroller is reset, the microcontroller may cut off the fuse.

According to another aspect of the invention, when the charge switch or the discharge switch is turned off after the microcontroller is reset, the microcontroller may enter into a permanent failure mode so as not to be reused.

According to another aspect of the invention, the microcontroller may turn off o the charge switch or the discharge switch when a voltage of the topmost cell is changed by approximately 1% or greater.

According to another aspect of the invention, the microcontroller may be reset when the battery cell is disengaged from the charge/discharge line.

According to another aspect of the present invention, a battery pack is provided. The battery pack includes a battery cell; a charge switch and a discharge switch installed in a charge/discharge line of the battery cell; a fuse installed in the charge/discharge line of the battery cell; and a microcontroller to sense and store voltages of the battery cell, and to controls the charge switch, the discharge switch, and the fuse based on the sensed voltages of the battery cell, wherein the microcontroller cuts off the fuse and turns off only of the charge switch or the discharge switch and when the battery cell is disengaged from the battery pack.

According to another aspect of the invention, the battery pack may further include a disengagement detecting switch to detect disengagement of the battery cell and to transmit an interrupt signal to the microcontroller.

According to another aspect of the invention, when the charge switch or the discharge switch is turned off and the fuse is cut off, the microcontroller may enter into a permanent failure mode.

According another aspect of the present invention, t a driving method of a battery pack is provided. The method includes verifying whether a microcontroller to sense and to store voltages of a battery cell is reset; if the microcontroller is reset, determining whether a voltage of the battery cell measured before the resetting of the microcontroller differs from a voltage of the battery cell measured after the resetting of the microcontroller; and if the voltage differs, turning off only one of a charge switch or a discharge switch installed in a charge/discharge line of the battery cell.

According to another aspect of the invention, the driving method may further include cutting off a fuse installed in the charge/discharge line of the battery cell after the turning off of the charge/discharge switch.

According to another aspect of the invention, the microcontroller may enter into a permanent failure mode so as not to be reused after the cutting off of the fuse.

According to another aspect of the invention, the verifying of whether the microcontroller is reset comprises resetting the microcontroller when the battery cell is disengaged from the battery pack.

According to another aspect of the invention the determining of whether the a voltage differs may include determining whether a voltage of the battery cell differs by 1% or greater, and if so, determining that the voltage of the battery cell differs.

According to another aspect of the present invention, a driving method of a battery pack is provided. The method includes detecting whether the battery cell is decapsulated from the battery pack, and generating an interrupt signal to interrupt a switch when the battery cell is determined to be decapsulated, and once the interrupt signal is generated, turning off only of a charge switch or a discharge switch installed in a charge/discharge line of the battery cell.

According to another aspect of the invention, the driving method may further include cutting off a fuse installed in the charge/discharge line after the turning off of the charge/discharge switch.

According to another aspect of the invention, after the fuse is cut off, the microcontroller may enter into a permanent failure mode so as not to be reused.

As described above, in the battery pack according to the present invention and the driving method thereof, since the battery pack can be prevented from being reused when battery cells are replaced from the battery pack, a charge switch, a discharge switch and a fuse are turned off and a microcontroller enters into a permanent failure mode to disable to be reused, the safety of the battery pack is enhanced.

Additional aspects and/or advantages of the invention will be set forth in part in the description which follows and, in part, will be obvious from the description, or may be learned by practice of the invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
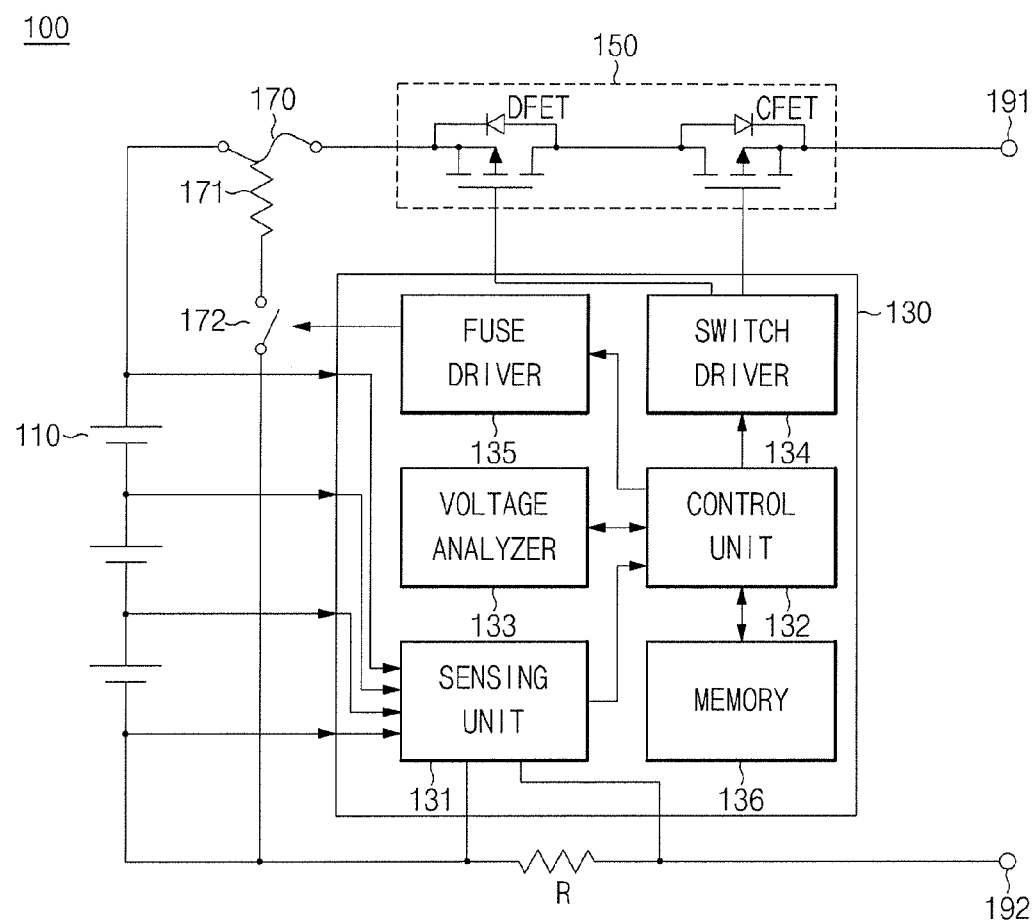
FIG. 1 is a block diagram illustrating a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In this specification, when a part is coupled to another part, the part can be said to be electrically coupled to another part the electrical coupling can comprise a third element disposed between the parts.

A battery pack 100 according to an embodiment of the present invention is illustrated in FIG. 1. The battery pack 100 includes a battery cell 110, a microcontroller 130, charge/discharge switches 150, and a fuse 170. The battery pack 100 may further include a current sensing resistor R to sense current flowing in the battery cell 110. The battery pack 100 may further include a positive terminal 191 and a negative terminal 192 to charge and/or discharge the battery cell 110. The charge/discharge switches 150 include a charge switch CFET and a discharge switch DFET.

The battery cell 110 may include a plurality of battery cells connected in series. The plurality of battery cells of the battery cell 110 are rechargeable battery cells. The respective battery cells of the battery cell 110 may be lithium ion battery cells that can be recharged up to approximately 4.2 V, but aspects of the present invention are not limited thereto; other types of rechargeable battery cells and maximum voltages may also be employed. The battery cell 110 is installed in a charge/discharge line between the positive terminal 191 and the negative terminal 192, and may be electrically connected to the fuse 170 and the charge/discharge switch 150 installed in the charge/discharge line. In addition, the battery cell 110 may be electrically connected to the microcontroller 130.

The microcontroller 130 is electrically connected to the battery cell 110 and the charge/discharge switch 150. The microcontroller 130 may also be electrically connected to the fuse switch 172 that controls the operation of the fuse 170. The microcontroller 130 senses voltages of the battery cell 110 and stores the sensed voltages. The microcontroller 130 may be configured to sense voltages of the battery cell 110 and store the sensed voltages, for example, approximately once every 125 ms in a normal mode in charging/discharging the battery pack 100, but aspects of the present invention are not limited thereto. The microcontroller 130 is programmed to be reset at the moment when the battery cell 110 is disengaged from the battery pack 100. In other words, the microcontroller 130 is reset immediately when the battery cell 110 is disengaged from the charge/discharge line. The microcontroller 130 detects the disengagement of the battery cell 110 based the sensed voltages of the battery cell 110. If the battery cell 110 is actually disengaged from a charge/discharge line, power to be supplied to the microcontroller 130 is interrupted, thereby resetting the microcontroller 130.

The microcontroller 130 may include various types of microcomputers manufactured for lithium ion batteries, but aspects of the present invention are not limited thereto. The microcontroller 130 may include a sensing unit 131, a control unit 132, a voltage analyzer 133, a switch driver 134, a fuse driver 135, and a memory 136. According to aspects of the present invention, the microcontroller may include additional and/or different units. Similarly, the functionality of two or more of the above units may be integrated into a single component.

The sensing unit 131 is electrically connected to the control unit 132. The sensing unit 131 senses the voltage, current, and temperature of the battery cell 110, although a temperature sensor is not shown. The sensing unit 131 senses voltages of the plurality of battery cells and an overall voltage of the battery cell 110 including the plurality of battery cells. An overall current of the battery cell 110, namely, a charge/discharge current, is sensed via the current sensing resistor R. The sensing unit 131 transmits the sensed voltages and current to the control unit 132. According to other aspects of the present invention, the sensing unit 131 may also transmit other sensed data to the control unit 132.

The control unit 132 is electrically connected to the sensing unit 131, the voltage analyzer 133, the switch driver 134, and the memory 136. The control unit 132 applies the voltage and current of the battery cell 110 sensed from the sensing unit 131 and stores the applied voltage and current in the memory 136. In addition, when the voltages of the battery cell 110 are not sensed from the sensing unit 131, the control unit 132 detects that the battery cell 110 is disengaged from the battery pack 100 and resets the microcontroller 130.

In a normal mode, the microcontroller 130 is generally reset to sense and store the voltages of battery cell 110 approximately once every 125 ms. Therefore, if voltages of the battery cell 110 are not sensed for approximately 0.5 seconds or longer, for example, the control unit 132 recognizes that the battery cell 110 is disengaged from the battery pack 100, but aspects of the present invention are not limited thereto. The control unit 132 may recognize a disengagement after more or less time elapses.

After the microcontroller 130 is reset, the control unit 132 senses voltages of the battery cell 110 reinstalled in the battery pack 100 from the sensing unit 131, and applies the sensed voltages to the voltage analyzer 133. The voltage analyzer 133 determines whether there is a change in the voltages of the battery cell 110. If so, the voltage analyzer 133 applies a voltage change signal to the control unit 132. Upon receiving the voltage change signal from the switch driver 134, the control unit 132 turns off the charge/discharge switch 150. Alternatively, the control unit 132 may turn off just one of a charge switch CFET or a discharge switch DFET. Upon receiving the voltage change signal through the switch driver 134, the control unit 132 cuts off the fuse 170 via the fuse driver 135. When the charge/discharge switch 150 is turned off and the fuse 170 is cut off, the control unit 132 controls the microcontroller 130 to enter into a permanent failure mode to prevent the microcontroller 130 from being reused.

The voltage analyzer 133 is electrically connected to the control unit 132. The voltage analyzer 133 compares a voltage of the battery cell 110 applied from the control unit 132 after the microcontroller 130 is reset with the previously applied voltage of the battery cell 110 and analyzes the voltages of the battery cell 110. The voltage analyzer 133 operates after the microcontroller 130 is reset, and analyzes a voltage change of the battery cell 110. The voltage analyzer 133 compares voltages of the battery cell 110 measured before and after the microcontroller 130 is reset. If the voltage of the battery cell 110 changes by approximately 1% or greater, the voltage change signal is applied to the control unit 132. When the voltage of the battery cell 110 changes by approximately 1% or greater, the voltage analyzer 133 determines that the battery cell 110 is disengaged from the battery pack 100. If the voltage change signal is applied to the control unit 132, the control unit 132 controls on/off states of the charge/discharge switch 150 and the fuse 170 via the switch driver 134 and the fuse driver 135, respectively.

The switch driver 134 is electrically connected to the control unit 132 and the charge/discharge switch 150. If the voltage change signal is applied from the voltage analyzer 133 to the control unit 132, the switch driver 134 turns off the charge/discharge switch 150. Alternatively, the charge switch CFET or the discharge switch DFET may be turned off. The fuse driver 135 is electrically connected to the control unit 132 and the fuse switch 172. If the voltage change signal is applied from the voltage analyzer 133 to the control unit 132, the fuse driver 135 cuts off the fuse 170.

The memory 136 is electrically connected to the control unit 132. The memory 136 may store the remaining capacity of the battery cell 110, which are applied through the control unit 132 and sensed by the sensing unit 131. In addition, when the battery pack 100 is installed in an external device (not shown), the memory 136 transmits the stored remaining capacity of the battery cell 110 to the external device to allow the external device to display the same. According to other aspects of the present invention, the memory may store other information about the battery pack 100 (including information sensed by the sensing unit 133), and transmit such information to the external device. For example, the memory 136 may store voltage information received from the sensing unit 133 via the control unit 132.

The charge/discharge switch 150 may include a charge switch CFET and a discharge switch DFET. The charge/discharge switch 150 may be installed in a charge/discharge line of the battery cell 110. Each control electrode of the charge switch CFET and the discharge switch DFET is electrically connected to the switch driver 134. The charge/discharge switch 150 may be turned on or off in response to a signal applied from the switch driver 134.

The charge switch CFET has a first electrode (source) electrically connected to the charge/discharge terminal 191 and a second electrode (drain) electrically connected to the discharge switch DFET. The discharge switch DFET has a first electrode (source) electrically connected to the fuse 170 and a second electrode (drain) electrically connected to the second electrode of the charge switch CFET. The charge switch CFET and the discharge switch DFET may be field effect transistors (FETs), and intrinsic parasitic diodes may be formed in a forward direction from the second electrode to the first electrode. Overcharge and overdischarge of the battery cell 110 can be prevented such that the charge switch CFET and discharge switch DFET are turned on/off. If a voltage change of the battery cell 110 is approximately 1% or greater after the microcontroller 130 is reset, the charge/discharge switch 150 may be turned off. Alternatively, only one of the charge switch CFET or the discharge switch DFET may be turned off.

The fuse 170 may be installed in the charge/discharge line of the battery cell 110. The fuse 170 is installed in the charge/discharge line between the battery cell 110 and the charge/discharge terminal 191 and is capable of controlling overcharge and overdischarge. The fuse 170 may further include a heating resistor 171 and a fuse switch 172 connected thereto. The fuse switch 172, which is electrically connected to the microcontroller 130, may be turned on or off in response to the signal applied from the fuse driver 135 of the microcontroller 130. When the fuse switch 172 is turned on in response to the signal applied from the fuse driver 135, the fuse 170 may be cut off via the heating resistor 171. In addition, the fuse 170 may be cut off when the voltage of the battery cell 110 is changed by approximately 1% or greater after the microcontroller 130 is reset.

The microcontroller 130 is configured such that it is reset when the battery cell 110 is disengaged from the battery pack 100, and after it is reset, if there is a change in the voltage of the battery cell 110, the microcontroller 130 turns off the charge/discharge switch 150 and cuts off the fuse 170. When the microcontroller 130 is reset and the charge/discharge switch 150 are turned off and the fuse 170 is cut off, the battery pack 100 is set in a permanent failure mode so that the microcontroller 130 may not be reused. Therefore, the safety of the battery pack 100 can be enhanced by preventing the battery pack 100 from being reused after the battery cell 110 is replaced.

Figure 2:
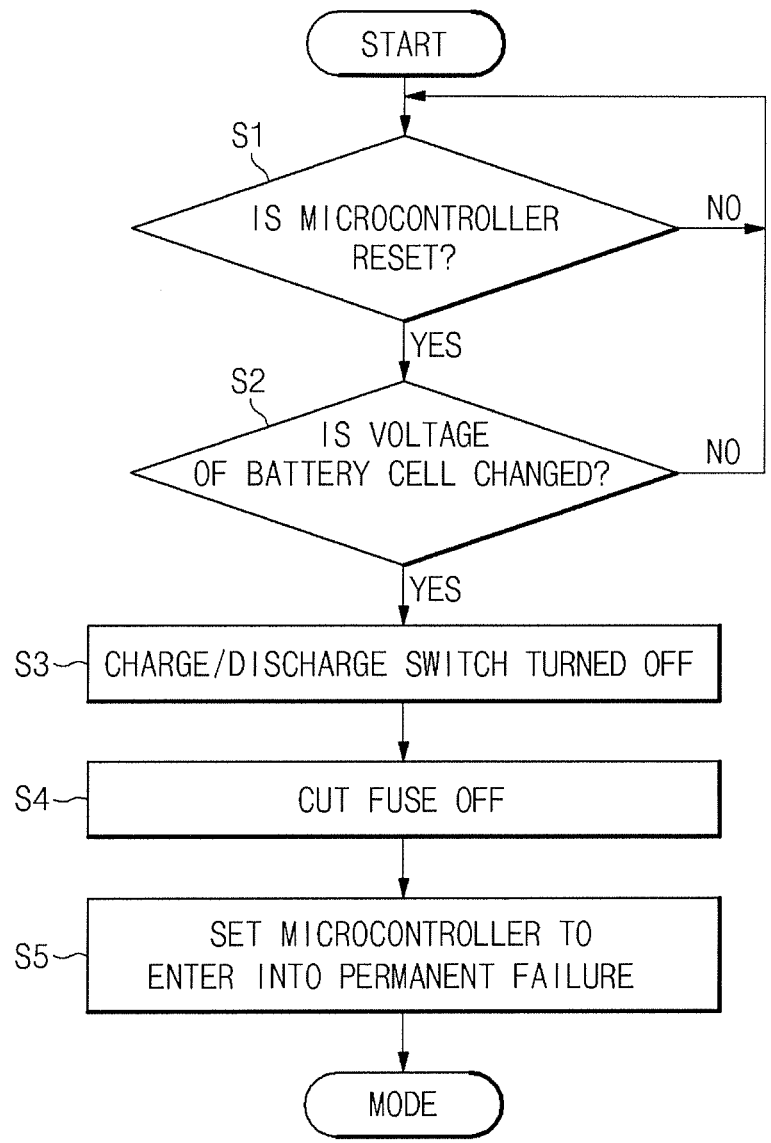
FIG. 2 is a flow chart illustrating a driving method of the battery pack illustrated in FIG. 1.

FIG. 2 is a flow chart illustrating a driving method of the battery pack illustrated in FIG. 1. As illustrated in FIG. 2, the driving method of the battery pack includes verifying whether the microcontroller is reset or not (S1), determining whether there is a voltage change of the battery cell (S2), controlling the charge/discharge switch to be turned off (S3), controlling the fuse to be cut off (S4), and setting the microcontroller to enter into a permanent failure mode (S5). Here, the battery cell is disengaged from the battery pack for being replaced, which is generally referred to as decapsulation.

In operation S1, the battery cell 110 is disengaged from the battery pack 100 to verify whether the microcontroller 130 is reset. If a voltage is not sensed from the battery cell 110, the microcontroller 130 determines that the battery cell 110 is disengaged from the battery pack 100 and the microcontroller 130 is reset.

If voltages of the battery cell 110 are not sensed for approximately 0.5 seconds or longer, for example, the microcontroller 130 recognizes that the battery cell 110 is disengaged from the battery pack 100, but aspects of the present invention are not limited thereto. If the microcontroller 130 is reset in operation S1, the routine goes to operation S2 of determining whether there is a voltage change of the battery cell 110. If the microcontroller 130 is not reset in operation S1, the procedure goes back to the beginning.

In operation S2, after the microcontroller 130 is reset, it whether the voltage of the battery cell 110 has changed is determined, as compared to the voltage measured before the microcontroller 130 is reset. After the battery cell 110 is disengaged from the battery pack 100, the microcontroller 130 senses voltages of the battery cell 110 reinstalled in the battery pack 100 and determines whether the sensed voltages of the battery cell 110 have changed. The microcontroller 130 compares voltages of the battery cell 110 with each other, the voltages measured before and after the microcontroller 130 is reset, and determines whether a voltage change of the battery cell 110 is approximately 1% or greater. When the voltage change of the battery cell 110 is approximately 1% or greater, it is determined that there is a voltage change of the battery cell 110. If there is a voltage change of the battery cell 110, the routine goes to operation S3 of controlling the charge/discharge switch to be turned off.

In operation S3, the charge/discharge switch is turned off in response to the signal applied from the microcontroller 130. In operation S3, the charge/discharge switch 150 is turned off, thereby preventing the battery cell 110 from being charged or discharged. Of course, only one of the charge switch and the discharge switch may be turned off.

In operation S4, the fuse 170 is cut off in response to the signal applied from the microcontroller 130. The cut-off of the fuse 170 prevents the battery cell 110 from being charged or discharged.

In operation S5, the microcontroller 130 is set in a permanent failure mode so as not to be reused. The permanent failure mode prevents the battery pack 100 from being reused after the battery cell 110 is replaced. Since the reuse of the battery pack 100 is prevented, the safety of the battery pack 100 can be enhanced.

Figure 3:
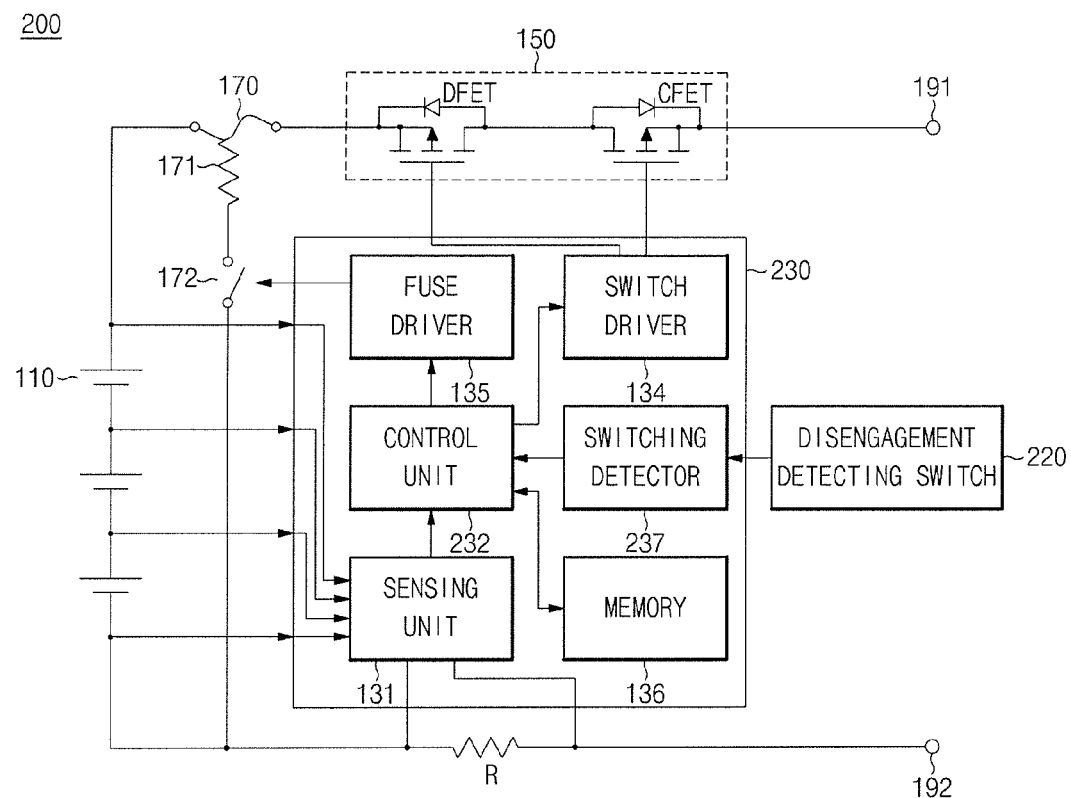
FIG. 3 is a block diagram illustrating a battery pack according to another embodiment of the present invention.

FIG. 3 is a block diagram illustrating a battery pack according to another embodiment of the present invention. As illustrated in FIG. 3, the battery pack 200 includes a battery cell 110, a disengagement detecting switch 220, a microcontroller 230, a charge/discharge switch 150, and a fuse 170. The battery pack 200 may further include a current sense resistor R sensing the current flowing in the battery cell 110. In addition, the battery pack 200 may further include a positive terminal 191 and a negative terminal 192 for charging/discharging the battery cell 110. The battery cell 110, the charge/discharge switch 150, and the fuse 170 of the battery pack 200 are substantially the same as those of the battery pack 100 shown in FIG. 1. The explanation that follows will be given with special reference to the disengagement detecting switch 220 and the microcontroller 230, which are features of the battery pack 200 distinguished from the battery pack 100.

The disengagement detecting switch 220 is electrically connected to the microcontroller 230. The disengagement detecting switch 220 detects whether a case (not shown) of the battery pack 200 has been removed, which is referred to as decapsulation If the decapsulation of the battery pack 200 is detected, an interrupt signal is generated and then transmitted to the microcontroller 230. The disengagement detecting switch 220 may be mounted in the case of the battery pack 200 so as to detect that the case of the battery pack 200 is removed, but aspects of the present invention are not limited thereto. If the decapsulation of the battery pack 200 is detected, the disengagement detecting switch 220 determines that the battery cell 110 has been replaced. Once the case of the battery pack 200 is decapsulated, the battery cell 110 is determined to be disengaged from the battery pack 200.

The microcontroller 230 may include various types of microcomputers manufactured for lithium ion batteries, but aspects of the present invention are not limited thereto. The microcontroller 230 may be electrically connected to the battery cell 110, the disengagement detecting switch 220, and the charge/discharge switch 150. In addition, the microcontroller 230 may be electrically connected to the fuse switch 172 controlling the operation of the fuse 170. The microcontroller 230 senses voltages of the battery cell 110. The microcontroller 230 may be configured to sense voltages of the battery cell 110 and store the sensed voltages, for example, approximately once for every 125 ms in a normal mode in charging/discharging the battery pack 100, but aspects of the present invention are not limited thereto. The microcontroller 230 includes a sensing unit 131, a controller 232, a switch driver 134, a fuse driver 135, a memory 136, and a switching detector 237. In the microcontroller 230, the sensing unit 131, the switch driver 134, the fuse driver 135 and the memory 136 are substantially the same as corresponding parts of the microcontroller 130 illustrated in FIG. 1, respectively.

The controller 232 is electrically connected to the sensing unit 131, the switch driver 134, the fuse driver 135, the memory 136, and the switching detector 237. The controller 232 receives the voltage and current of the battery cell 110 sensed by the sensing unit 131 and stores the same in the memory 136. When the interrupt signal is applied from the disengagement detecting switch 220 via the switching detector 237, the controller 232 controls the charge/discharge switch 150 to be turned off and the fuse 170 to be cut off by means of the switch driver 134 and the fuse driver 135. In addition, when the charge/discharge switch 150 are turned off and the fuse 170 is cut off upon receiving the interrupt signal from the switching detector 237, the controller 232 sets the microcontroller 230 in a permanent failure mode so as not to be reused. Thus, the controller 232 can prevent the battery pack 200 from being reused after the battery cell 110 has been replaced.

The switching detector 237 is electrically connected to the disengagement detecting switch 220 and the controller 232. The switching detector 237 receives the interrupt signal from the disengagement detecting switch 220. When the battery pack 200 is decapsulated, the switching detector 237 applies the interrupt signal to the controller 232. In other words, the switching detector 237 detects whether the disengagement detecting switch 220 operates, and transmits the sensing result to the controller 232.

The battery pack 200 detects decapsulation of the battery pack 200 via the disengagement detecting switch 220 to turn off the charge/discharge switch 150 and to cut off the fuse 170. Alternatively, only one of the charge switch and the discharge switch may be turned off. In addition, if the battery pack 200 is decapsulated and the charge/discharge switch 150 are turned off and the fuse 170 is cut off, the battery pack 100 sets the microcontroller 230 in the permanent failure mode so as not to be reused. Therefore, the safety of the battery pack 200 can be enhanced by preventing the battery pack 200 from being reused after the battery cell 110 is replaced.

Figure 4:
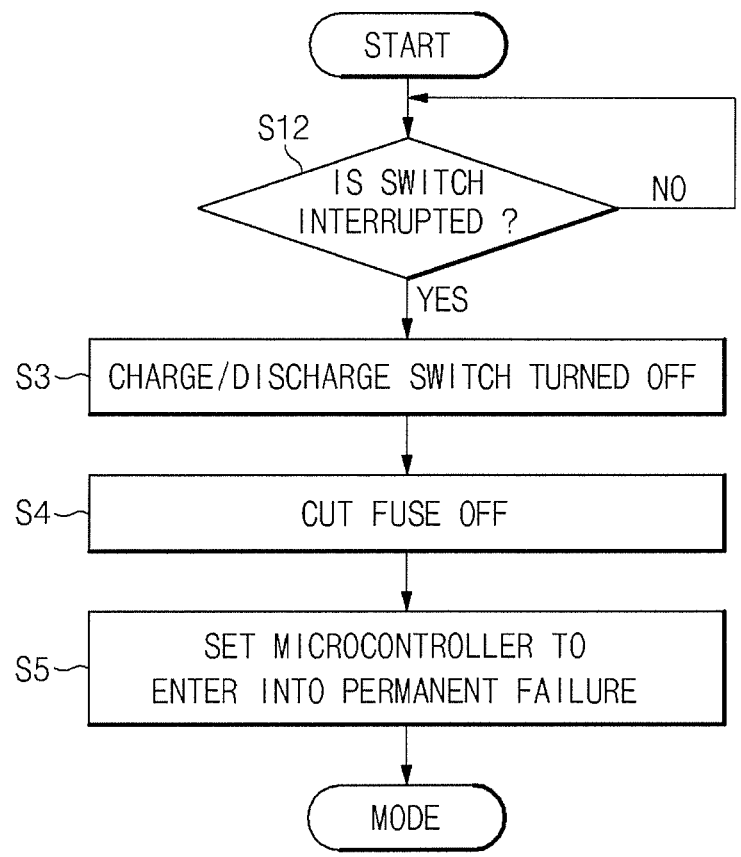
FIG. 4 is a flow chart illustrating a driving method of the battery pack illustrated in FIG. 3.

FIG. 4 is a flow chart of a driving method of the battery pack illustrated in FIG. 3. The driving method of the battery pack includes interrupting a switch (S12), controlling a charge/discharge switch to be turned off (S3), cutting off a fuse (S4) and setting a microcontroller in a permanent failure mode (S5).

In operation S12, the disengagement detecting switch 220 detects decapsulation of the battery pack 200. If the battery pack 200 is decapsulated, the disengagement detecting switch 220 generates an interrupt signal. In operation S12, the interrupt signal generated in the disengagement detecting switch 220 is transmitted to the microcontroller 230. If the battery pack 200 is decapsulated (that is, the procedure flows along a "YES" path), the routine goes to operation S3 of controlling the charge/discharge switch to be turned off, and if the battery pack 200 is not decapsulated (that is, the procedure flows along a "NO" path), the procedure goes back to the beginning.

In operation S3, the charge/discharge switch 150 is turned off in response to the signal applied from the microcontroller 230. The charge/discharge switch 150 are both turned off via the microcontroller 230 in response to the interrupt signal applied from the disengagement detecting switch 220, thereby preventing the battery cell 110 from being charged or discharged. Of course, only one of the charge switch and the discharge switch may be turned off.

In operation S4, the fuse 170 is cut off in response to the signal applied from the microcontroller 230. The fuse 170 is cut off via the microcontroller 230 in response to the interrupt signal applied from the disengagement detecting switch 220, thereby secondarily preventing the battery cell 110 from being charged or discharged.

In operation S5, the microcontroller 230 is set in a permanent failure mode so as not to be reused. The microcontroller 230 is set in the permanent failure mode, thereby preventing the battery pack 200 from being reused after the battery cell 110 is replaced. Since the reuse of the battery pack 200 is prevented, the safety of the battery pack 200 can be enhanced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
   a battery cell;
   a charge switch and a discharge switch installed in a charge/discharge line of the battery cell;
   a fuse installed in the charge/discharge line of the battery cell; and
   a microcontroller programmed to sense and store voltages of the battery cell, and to control the charge switch, the discharge switch, and the fuse based on the sensed voltages of the battery cell;
   wherein the microcontroller is programmed to cut off the fuse and turn off only one of the charge switch and the discharge switch when the battery cell is disengaged from the battery pack, and
   wherein the microcontroller is programmed such that when the charge switch or the discharge switch is turned off and the fuse is cut off, the microcontroller enters into a permanent failure mode to prevent the microcontroller from being reused.

2. The battery pack of claim 1, further comprising a disengagement detecting switch to detect disengagement of the battery cell and to transmit an interrupt signal to the microcontroller.

* * * * *